United States Patent [19]

Touchette

[11] 4,364,333
[45] Dec. 21, 1982

[54] CATTLE FEEDER

[75] Inventor: Bernard Touchette, Ste-Therese, Canada

[73] Assignee: B. R. Choiniere Ltee, Boisbriand, Canada

[21] Appl. No.: 158,403

[22] Filed: Jun. 11, 1980

[30] Foreign Application Priority Data

Mar. 5, 1980 [CA] Canada ............................. 347051

[51] Int. Cl.³ .............................................. A01K 5/00
[52] U.S. Cl. ................................................... 119/52 R
[58] Field of Search ...................... 119/52 R, 53, 53.5, 119/58, 60

[56] References Cited

U.S. PATENT DOCUMENTS

| | | | |
|---|---|---|---|
| 2,171,998 | 9/1939 | Trapani | 119/53 |
| 3,565,044 | 2/1971 | Sorrels | 119/53 |
| 3,782,333 | 1/1974 | Feterl | 119/52 R |
| 3,999,520 | 12/1976 | Feterl | 119/58 |
| 4,078,523 | 3/1978 | Etzler | 119/58 |
| 4,258,663 | 3/1981 | Schoessow | 119/58 |

Primary Examiner—Paul J. Hirsch
Assistant Examiner—Robert P. Swiatek
Attorney, Agent, or Firm—Larson and Taylor

[57] ABSTRACT

A cattle feeding box mounted on a four wheel farm wagon of the type having a narrow reach between the steerable fore carriage and the rear axle. The feeding box has an elongate open top rectangular receptacle with lateral open walls presenting a plurality of feeding stations communicating with the inside of the feeder box. The bottom of the feeding box has a narrow central raised portion extending longitudinally for defining a space for the reach of the farm wagon, and vertical trough walls border the central raised portion. Feeding trough bottom surfaces extending outwardly from the lower edge of each trough wall, and raising slightly at their respective free edge define a relatively low and deep feed receiving pocket at each feeding station. A full width central divider disposed over the central raised portion directs the feed outwardly.

12 Claims, 7 Drawing Figures

CATTLE FEEDER

BACKGROUND OF THE INVENTION

This invention relates to cattle feeders, and in particular to those feeders which are designed to be filled with feed at a filling station and then moved to a different location for feeding cattle.

One such cattle feeder is disclosed in U.S. Pat. No. 2,290,042 issued on July 14, 1942 for an invention of A. D. GRANVILLE entitled Combination Feed Carrier and Feeder. A more modern cattle feeder is described in U.S. Pat. No. 3,782,333 dated Jan. 1, 1974 for a Livestock Feeder. These and other prior cattle feeders use two spaced apart wheel axles secured to the floor structure of the feeder, one of which has steerable wheels and is connected to a draw bar for coupling behind a tractor or other farm equipment.

In such structures the floor of the feeder transmits the longitudinal forces from one axle to the other when the feeder is being displaced. These forces are considerable when such a cattle feeder is caused to travel fully loaded over unprepared grounds; the structure of the floor is often subjected to excessive tensions resulting in failure of floor components. In some cases the front axle or the rear axle may separate completely from the cattle feeder when obstacles on the ground are encountered.

SUMMARY OF THE INVENTION

An object of this invention is to provide a wheeled cattle feeder which is designed to withstand a substantial load of feed, of the order of say 5 to 10 tons, which comprises relatively low feeding stations for feeding even young cattle, and which is free of the shortcomings of prior cattle feeders.

Another object of this invention is to provide a wheeled cattle feeder of the above noted type which comprises an ordinary farm wagon and a compatible cattle feeder box so mounted thereon as to be removed when it is desired to use the farm wagon for other purposes. In such an arrangement the tensions in the longitudinal axis are taken by the farm wagon which is designed to supports such efforts.

We have found that these objects can be met by means of a cattle feeder box whose bottom has a narrow central raised portion extending longitudinally of the feeder box for defining a space for the reach of the farm wagon, a substantially vertical though wall one each side of this raised portion between the wheels of the wagon, a feed trough bottom surface extending outwardly from the lower edge of each trough wall and raising slightly at its free edge in order to define with the trough wall a relatively low and deep feed receiving pocket at each feeding station between the wheels of the wagon, a pair of parallel beams disposed at each upper corner of the raised central portion of the bottom and resting upon the axles of the wagon and two downwardly and inwardly directed racks consisting of rack defining upright members which are rigidly secured to and extend between the lower region of each side panel of the feeder box and the adjacent beam. Some of such rack defining members are preferably of triangular configuration and are so disposed as to provide vertical support for the adjacent feed trough bottom surfaces.

The raised central portion of the bottom may be covered with a full-width dividing structure made of two outwardly and downwardly extending planar panels, or with a horizontal floor panel resting upon the beams of the feeder box.

With this arrangement the bottom of the feed receiving pockets disposed between the wheels of the wagon is below the top of the wheels of the wagon and consequently the height of the free edge of these feeding stations is no longer determined by the size of the wagon wheels. Moreover, these feed receiving pockets may extend outwardly slightly beyond the wheels of the wagon and additional feeding stations with a raised floor may be provided over each wheel. It follows that the wheels and the axles are completely covered by the feeder box and this feature is important to prevent injuries to the animals particularly to their legs. In addition, the resultant wheeled feeder is less likely to have an excessively wide track and its wheels are less likely to interfere with fence posts and other vertical obstacles when being moved on a farm. The presence of a raised central portion which is relatively narrow coupled with the fact that the racks extend upwardly and outwardly from the sides of this raised central portion give rise to a natural tendency for the feed to fall into the feed receiving pockets. The presence of strong supports for these pockets, which supports are attached to the side walls of the feeder box, causes a transfer of the load from the beams to the side walls which can easily be designed to carry such vertical loading without plastic deformation. In other words, a portion of the load is taken by the side walls which are much stronger than the relatively small longitudinal beams of the bottom structure, resulting in increased loading capacity for such a feeder.

It was also found that the presence of trough walls immediately below each beam facilitates feeding because these walls retain the feed outwardly of the central portion of the feeder's bottom where it can more easily be eaten by the animals.

BRIEF DESCRIPTION OF THE DRAWINGS

An examplary embodiment of a wheeled cattle feeder made in accordance with this invention is illustrated in the accompanying drawings wherein.

DESCRIPTION OF A PREFERRED EMBODIMENT

Figure 1:
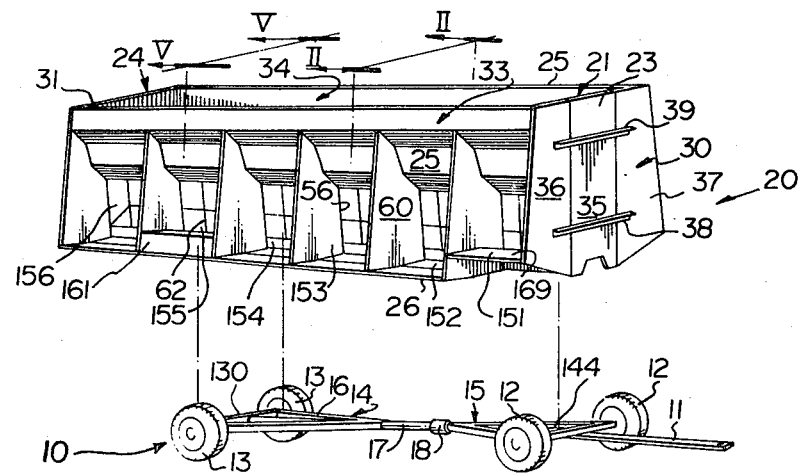
FIG. 1 is a perspective view of a cattle feeder box and of a farm wagon of the pivotal frame type disposed below the cattle feeder box.

Referring now to the drawings, the illustrated wheeled cattle feeder comprises a farm wagon 10 and a cattle feeder box 20 adapted to rest upon and be suitably secured to wagon 10 so as to be transported empty or loaded with feed when a tractor or like vehicle (not shown) draws pole 11 of wagon 10.

Wagon 10 comprises two steerable front wheels 12, two rear wheels 13 and a pivotal X-shaped frame 14 preferably made of welded steel components of considerable strength. In the illustrated frame design the traction pole or draw bar 11 is secured to the fore carriage 15 which is of triangular configuration. Fore carriage 15 supports steerable front wheels 12 and the necessary steering mechanism (not shown) which is controlled by draw bar 11 in a well known manner. Hind carriage or rear axle 16 mounts rear wheels 13 in a conventional manner, and a longitudinally extending tube (17) and pivotal coupling (18) form a reach between fore carriage 15 and rear axle 16. Such all-purpose farm wagons are readily available from different manufacturers of farm implements. The assignee hereof produces such a farm wagon which it sells under the trade mark DION.

Figure 2:
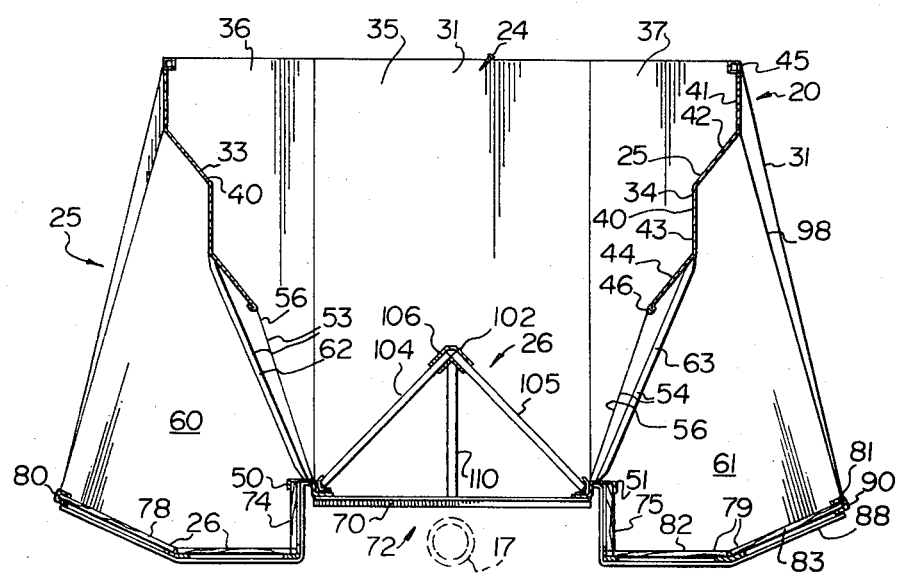
FIG. 2 is a transverse cross-sectional view of the cattle feeder box of FIG. 1 and taken along line II—II thereof.

The illustrated cattle feeder box 20 consists of an elongate container having an open top at 21 for loading feed therein, two opposite end walls 23, 24, two lateral walls 25 and a bottom 26 which define a generally rectangular receptacle or container for the feed. The structure of box 20 comprises two vertical end panels 30, 31 each defining an end wall 23, 24 and two lateral panels 33, 34 whose ends are secured to end panels 30, 31 preferably by welding. In order to gain access to the interior of feeder box 20 from an end thereof, one or both end panels 30, 31 may have a plywood panel 35 suitably removably retained to side panels 36, 37 which are made of strong sheet metal. Angle irons 38, 39 interconnect side panels 36, 37. Lateral panels 33, 34 define the upper closed portions of the lateral walls 25 of box 20, and each panel 33, 34 is constituted by a constant cross-section member 40 made of rigid sheet metal, such as steel, which is bent along parallel longitudinal straight lines. Thus each lateral panel 33, 34 presents from top to bottom (as best shown in FIG. 2) a first vertical section 41, a first inwardly and downwardly extending section 42, a second vertical section 43, and a second inwardly and downwardly extending section 44, all of which are contiguous and of comparable width and cooperate to define a generally inwardly and downwardly extending lateral support for the load of feed. Lateral panels 33, 34 are parallel to one another and are symmetrical relative to the central vertical plane of box 20. Added strength is provided at the top edges of lateral panels 33, 34 by a square profile 45 welded thereto, and the bottom edges of these lateral panels are folded back as at 46.

Cattle feeder box 20 also comprises a pair of parallel transversely spaced apart channel shaped beams 50, 51 whose opposite ends are rigidly secured to the end panels 30, 31, and a pair of downwardly and inwardly directed racks 53, 54 extending between the lower region of lateral panels 33, 34 and the adjacent beams 50, 51. These racks are defined by the inner edges 56 of a plurality of vertically extending equidistant partitions or wings 60, 61 on each side of box 20, and by upright bars 62, 63 disposed between successive wings 60, 61 and essentially parallel to the inner edges 56 of these wings.

Each partition 60, 61 consists of a rigid planar sheet metal member of substantially triangular configuration welded at its upper end to the back of the adjacent lateral panel 33 or 34 along sections 42, 43 and 44 thereof. The inner lower corner of each partition 60, 61 is secured to the adjacent beam 50, 51 as by welding (see FIG. 3). Upright bars 62, 63 (omitted from FIG. 3) extend from lateral panels 33 or 34 to the nearer beam 50, 51, and provide additional physical connection between the lateral panels and the floor which will be described below. In the illustrated embodiment, each upright bar 62, 63 is welded to the region of the bend between sections 43 and 44, while its lower end is welded to the upper inner edge of beam 50, 51.

Wings or partitions 60, 61 project outwardly of the side walls 25 of the cattle feeding box 20 and in effect divide them into a plurality of rectangular feeding stations, six of which are shown at 65 in the embodiment of FIG. 1. Each feeding station 65 communicates with the inside of the cattle feeding box 20 through rectangular openings below panels 33, 34 and these rectangular openings are further divided by upright bars 62, 63.

Bottom 26 comprises the above noted two parallel spaced apart beams 50, 51 and a plurality of horizontal transverse braces 70 which interconnect beams 50, 51 at spaced apart locations thereof. A plurality of panels supported to these beams or suspended from partitions 60, 61 define a bottom surface for the feed loaded into feeder box 20. Bottom 26 comprises a raised central portion 72 into which the reach 17 of wagon 10 extends. The outer edges of beams 50, 51 define the upper corner of central portion 72. A trough wall 74, 75 projects essentially vertically downwardly from each beam 50, 51 and from the lower edge of each trough wall 74, 75 a trough bottom 78, 79 extends outwardly with a raised free edge 80, 81. Each trough bottom 78, 79 preferably has an inner horizontal panel 82 and an inclined outer panel 83.

Figure 3:
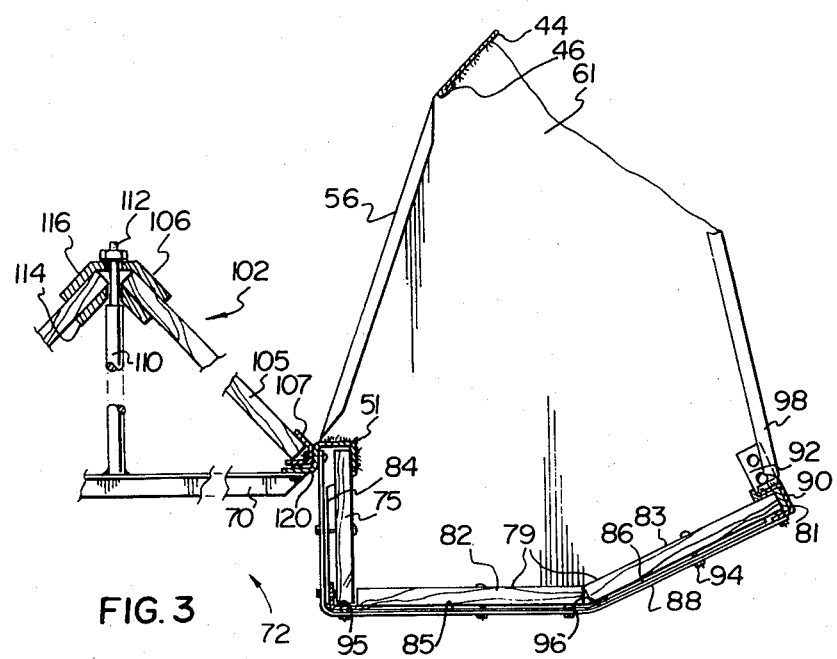
FIG. 3 is a partial transverse cross-sectional view of the components shown in FIG. 2 but drawn to a larger scale.

As shown in greater details in FIG. 3 partitions 60 and 61 have their lower edges bent at right angles so as to form flanges 84, 85, 86 for receiving the distal edges of trough panels 75, 82 and 83. In order to provide support at both sides of the partitions disposed in the middle region of the feeder box a rigid strip of metal 88 wider than flanges 84, 85, 86 is secured thereto in such a position as to extend parallel to but in the direction opposite to these flanges. This strip of metal 88 may be conveniently attached to the adjacent beam 50, 51 as by a bolt, and its outer end may be secured to a U-shaped edge member 90 which runs along and confines the outer raised edges 80, 81 of trough bottom 78, 79. Edge member 90 is also secured to partitions 60, 61 by means of welded ears 92 bolted to the partitions. Trough panels 75, 82, 83 are held in place by bolts such as shown at 94. These panels are further supported by longitudinal angle iron 95 and obtuse profile 96 bolted to flanges 84, 85 and 86 and to strip 88.

The inner edge 56 and the outer edge 98 of partitions 60, 61 are folded twice at right angles in order to present suitably wide edges. This is necessary in order to insure sufficient lateral rigidity to partitions 60, 61 and to avoid all sharp edges which could injure the animals.

Over the raised central portion 72 of bottom 26 a full width divider 102 is provided which comprises two downwardly directed divider panels 104, 105 from apex 106 located centrally of bottom 26. The outer edge of each divider panel 104, 105 is received into a substantially U-shaped channel 107 bolted to the inner edge of the adjacent beam 50, 51. The upper flange of channel 107 is parallel to the associated divider panel 104, 105 while the two other sides of channel 107 are shaped to conform to the adjacent surfaces 120 of beams 50, 51.

Apex 106 is defined by posts 110 supported by braces 70 and terminating as a threaded extension 112. An apertured angle iron 114 is mounted to the free end of posts 110 to define bearing surfaces for the upper edges of divider panels 104, 105 and a suitably shaped ridge member 116 holds the assembly together when nuts are screwed to threaded extensions 112.

The height of posts 110 should be limited in order to prevent bridging of the feed between apex 106 and lower edge 46 of panels 33, 34.

In an alternative embodiment (not shown) the central divider 102 is completely omitted, and a horizontal floor is provided instead. Such floor consists of a panel which fits between beams 50, 51 supported by the inner flanges 120 thereof and by transverse braces 70. With this alternate arrangement feed tends to flow outwardly into the lateral feed receiving pockets defined by trough panels 75 and 79 as it is consumed by the cattle, and when only a limited amount of feed is left over the central portion of bottom 26 the animals can easily pass their head between bars 62, 63 and partitions 60, 61 to bring the feed outwardly into the lateral pockets or troughs.

Figure 5:
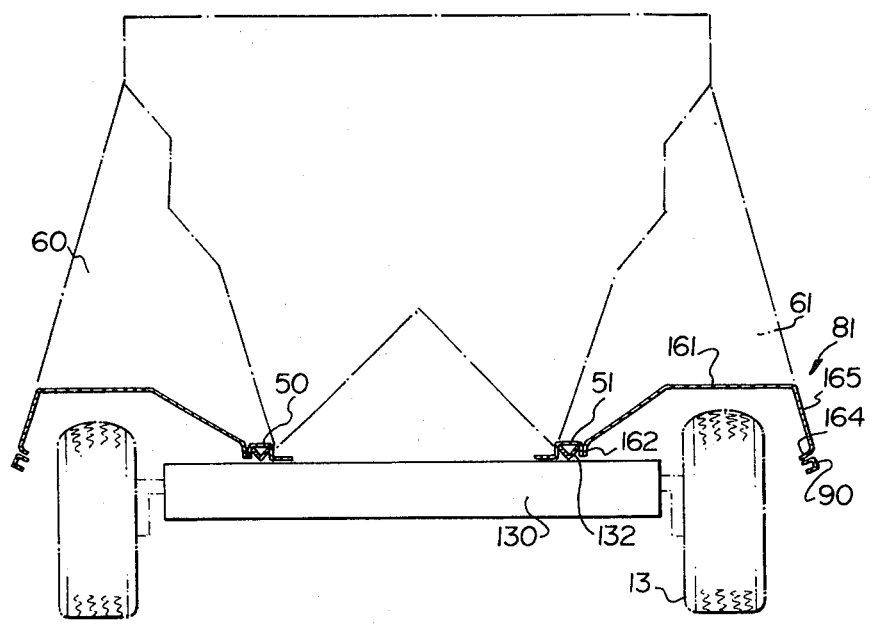
FIG. 5 is a partial transverse cross-sectional view taken along line V—V of FIG. 1.

As best shown in FIG. 5 the entire weight of feeder box 20 is applied to the axles of the wagon by beams 50, 51. Illustrated axle 130 is the rear axle of the farm wagon illustrated in FIG. 1. A similar approach is used at the front axle over which beams 50, 51 rest. Each section of beams 50, 51 disposed over an axle is reinforced by means of a V-shaped steel member 132 secured by welding and extending a sufficient distance, for example, 2 feet forwardly and rearwardly of the axle.

Figure 4:
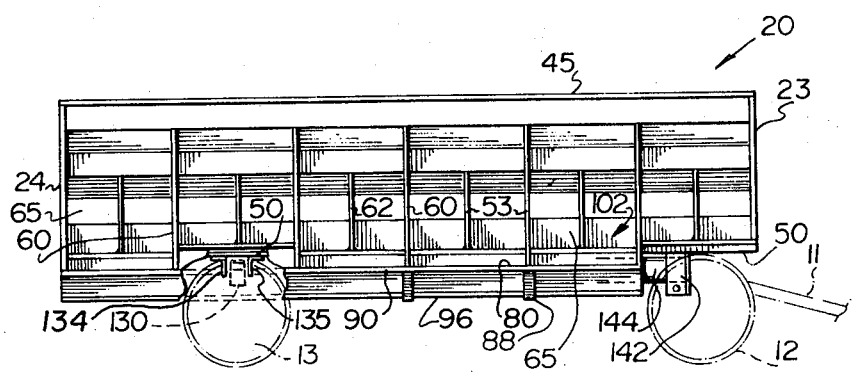
FIG. 4 is a side elevational view of the cattle feeder box of FIG. 1.

The rear portion of feeder box 20 may be retained to the rear axle by means of angle irons 134, 135 which, as shown in FIG. 4 are mounted transversely under beams 50, 51 with their vertical flanges spaced apart just sufficiently to closely receive therebetween the rear axle 130. Bolts extending through both flanges and through axle 130 complete the rear connection which is easily removable.

Figure 6:
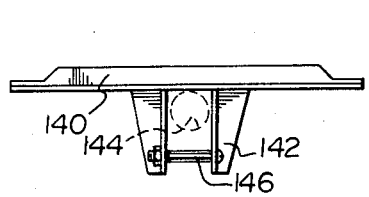
FIG. 6 is a front elevational view of a frame member with lugs for attaching the front of the feeder box to the fore carriage of a farm wagon.
Figure 7:
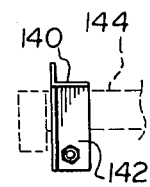
FIG. 7 is a side elevational view of the frame member of FIG. 6.

At the front end it may be preferable to provide a central floating connection in order to free the fore carriage 15 from the box when travelling unloaded. To this end a transverse frame member 140 as shown in FIGS. 6 and 7 may be used. It is secured across beams 50, 51. This frame member 140 which is preferably made of a relatively heavy angle iron supports a pair downwardly extending lugs 142 between which a central frame member 144 of fore carriage 15 is received with limited lateral play. A transverse bolt 146 interconnects lugs 142 and prevents complete withdrawal of lugs 142 from the farm wagon's fore carriage member 144 but allows a significant amount of vertical play.

Referring again to FIGS. 1 and 4, the disclosed embodiment has on each side a first feeding station 151 disposed over front wheel 12, three intermediate feeding stations 152, 153, 154, a fifth station 155 over rear wheel 13 and a cantilevered feeding station 156 disposed behind the rear axle 130. Obviously different numbers and arrangements of feeding stations can be designed within the scope of this invention to suit different needs and applications. For instance if a longer farm wagon was used the rear wheels would be closer to the rear end wall 31 or a longer intermediate region of the feeder box 20 could be provided.

Over each wheel 12, 13 the feeding station 151, 155 has a raised bottom surface in order to leave enough space for the wheels of the wagon 10. As shown in FIG. 5 this bottom surface is obtained by means of a folded sheet metal rectangular member 161 whose inner edge 162 is bolted or otherwise secured to the outer flange of the adjacent beam 50, 51 while the outer edge 164 below outer wall 165 is bolted to U-shaped edge member 90. The feeding stations 151 over the front wheels are constructed in a similar fashion except that the folded sheet metal member 169 which defines its bottom surface has no outer wall 165 to leave ample room for steerable wheels 12.

The bottom surface 79 of the feeding stations 152, 153 and 154 disposed between the wheels is below the top of these wheels and can be designed to be as low as desired. Thus the height of these feeding stations is not determined by the diameter of the wheels of the wagon nor by the height of the frame thereof.

The free edge 81 of the feeding stations is preferably outwardly of the wheels of the wagon. With all four wheels properly covered by the structure of feeder box 20 there is less danger for the animals to get hurt when moving around the feeding stations. Such a wheeled cattle feeder may be designed to have an acceptable track for travelling on roads, and the absence of outwardly projecting wheels reduces the danger of hitting fence posts, corner structures and other similar vertical objects.

In a particular physical embodiment of this invention, each side panel 33, 34 is made of two 10 feet sections secured along their inner abutting edges by bolted overlapping metal plates to produce a feeder box measuring 20 feet long. The width of the feeder box is just over 7 feet for a feed carrying capacity of 8 tons. The particular farm wagon 10 used is a 9 ton DION farm wagon. The longitudinal beams 50, 51 are made of 14 gauge steel in strip form measuring 7 inches and folded in a U-shape with an inner flange 1½ inches wide located 1½ inches below the top surface of the beam. When installed the outer walls of beams 50, 51 are located 3 feet apart and the width of the trough bottom 79 between trough wall 75 and edge member 90 is 2½ feet. The height of trough wall 75 is 8 inches. This feeder box has a relatively narrow central raise portion in its bottom and relatively wide feed receiving pockets. Due to the fact that the racks defined by inner edges 56 of partitions 60, 61 and by upright bars 62, 63 are inclined outwardly there is a definite tendency for the feed to automatically fill the feeding stations. This outward shift of a portion of the load releives the components of the central raised portion of the floor structure of a significant proportion of the load and applies it to the trough bottoms 79. The load on trough bottoms 79 is transferred to the side panels 33, 34 by means of partitions 60, 61 which are of triangular configuration and whose inner upper edge is adequately welded to the outer surface of the adjacent side panel 33, 34. Side panels 33, 34 are made of strong sheet metal bent so as to present alternating vertical planes and inwardly and downwardly projecting planes to provide a feed container whose side walls are of gradually diminishing width from top to bottom. 14 gauge steel sheets 3 feet wide constitute a satisfactory starting material to produce 30 inches tall side panels 33, 34. A preferred inclination of sections 42 and 44 with respect to the vertical is 40 degrees.

While there has been described and illustrated a preferred embodiment of the present invention, it is apparent that numerous alterations, omissions and additions may be made without departing from the spirit thereof.

I claim:

1. A cattle feeding box adapted to be removably mounted to a four wheel farm wagon of the type having a narrow reach between the steerable fore carriage and the rear axle, said cattle feeding box comprising an elongate open top rectangular receptacle having a bottom, front and rear end walls extending upwardly and essentially vertically from said bottom at each opposite end thereof, and two lateral walls extending between said end walls, each lateral wall comprising a lateral panel which extends downwardly from the upper edge of the corresponding lateral wall and terminates well above said bottom, and a plurality of feeding stations below said lateral panel whereby cattle may have access to feed on said bottom comprising a generally narrow central raised portion extending longitudinally of said cattle feeding box and providing vertical support for the feed thereabove, the underside of said central raised portion defining a unobstructed longitudinal space for the reach of said farm wagon, said bottom also having a substantially vertical trough wall on each side of said central raised portion between the front and rear wheels of said farm wagon, a feed trough bottom surface extending outwardly from the lower edge of each trough wall and rising slightly at its free edge in order to define with said trough wall a relatively low and deep feed receiving pocket at each feeding station between the front and rear wheels of said farm wagon, and a pair of parallel beams disposed at each upper corner of said raised central portion, said beams extending between said front and rear walls and resting upon the front axle of said fore carriage and upon said rear axle, said cattle feeding box also having two downwardly and inwardly directed racks, each of which comprises a plurality of upright bars which are rigidly secured to and extend between the lower region of said lateral panel of each of said lateral walls and the adjacent one of said beams and of a plurality of vertical, outwardly projecting partitions extending between said feed receiving pockets and the outer surfaces of said lateral panels and laterally deliminating said feeding stations, and, wherein each of said partitions is essentially of triangular configuration and has its lower edges bent at a right angle, thus forming integral flanges extending along said trough wall and along said trough bottom surface, each feeding station between said front and rear wheels comprising individual trough panels forming said trough wall and said trough bottom surface, said individual trough panels being supported by said integral flanges.

2. A cattle feeding box as defined in claim 1, wherein said trough bottom surface is formed by two contiguous panels, an inner, horizontal one and an outer one extending outwardly and slightly upwardly from the outer edge of the inner one.

3. A cattle feeding box as defined in claim 2, wherein said central raised portion of said bottom is covered by a dividing structure made of two outwardly and downwardly extending divider panels, said dividing structure also having a longitudinally extending angle iron held in an inverted "V" position at the center of said bottom and to which the inner edges of said divider panels are supported and secured, the outer edge of each divider panel being supported by and secured to the corresponding one of said beams thereby to form a feed divider which extends the full width between said racks.

4. A cattle feeding box as defined in claim 3, additionally comprising transverse braces interconnecting said beams at spaced apart locations therealong, two closely spaced apart angle irons each having two flanges, said angle irons being parallel to said transverse braces and bring mounted with one of their flanges projecting downwardly to closely fit on each side of said rear axle, said cattle feeding box further comprising bolts or the like extending through said downwardly projecting flanges via apertures in said rear axles for holding same together.

5. A cattle feeding box as defined in claim 2, wherein said trough bottom surfaces extend outwardly beyond said wheels, and comprising raised trough bottoms over each wheel of said farm wagon, said raised trough bottoms extending outwardly from the outer edge of the adjacent one of said beams and a short distance over the associated one of said wheels.

6. A cattle feeding box as defined in claim 5, also comprising a U-shaped edge member receiving therein the edge of the outer one of said two contiguous panels of said trough bottom surfaces and supporting the outer edge of said raised trough bottoms over the rear wheels of said farm wagon, and a plurality of lugs welded to spaced apart locations along said edge member, all of said lugs on a given edge member being parallel to one another and having their free ends rigidly secured to the outer lower corners of the associated partitions.

7. A cattle feeding box as defined in claim 1, wherein the width of said central raised portion is about equal to the width of each of said feed trough bottom surfaces.

8. A cattle feeding box as defined in claim 1, wherein said central raised portion of said bottom is covered by a dividing structure made of two outwardly and downwardly extending divider panels, said dividing structure also having a longitudinally extending angle iron held in an inverted "V" position at the center of said bottom and to which the inner edges of said divider panels are supported and secured, the outer edge of each divider panel being supported by and secured to the corresponding one of said beams thereby to form a feed divider which extends the full width between said racks.

9. A cattle feeding box as defined in claim 1, wherein said central raised portion of said bottom is covered by a dividing structure made of two outwardly and downwardly extending divider panels, said dividing structure also having a longitudinally extending angle iron held in an inverted "V" position at the center of said bottom and to which the inner edges of said divider panels are supported and secured, the outer edge of each divider panel being supported by and secured to the corresponding one of said beams thereby to form a feed divider which extends the full width between said racks.

10. A cattle feeding box adapted to be removably mounted to a four wheel farm wagon of the type having a narrow reach between the steerable fore carriage and the rear axle, said cattle feeding box comprising an elongate open top rectangular receptacle having a bottom, front and rear end walls extending upwardly and essentially vertically from said bottom at each opposite end thereof, and two lateral walls extending between said end walls, each lateral wall comprising a lateral panel which extends downwardly from the upper edge of the corresponding lateral wall and terminates well above said bottom, and a plurality of feeding stations below said lateral panel whereby cattle may have access to feed on said bottom comprising a generally narrow central raised portion extending longitudinally of said cattle feeding box and providing vertical support for the feed thereabove, the underside of said central raised portion defining an unobstructed longitudinal space for the reach of said farm wagon, said bottom also having a substantially vertical trough wall on each side of said central raised portion between the front and rear wheels of said farm wagon, a feed trough bottom surface extending outwardly from the lower edge of each trough wall and rising slightly at its free edge in order to define with said trough wall a relatively low and deep feed receiving pocket at each feeding station between the front and rear wheels of said farm wagon, and a pair of parallel beams disposed at each upper corner of said raised central portion, said beams extending between said front and rear walls and resting upon the front axle of said fore carriage and upon said rear axle, said cattle feeding box also having two downwardly and inwardly directed racks, each of which comprises a plurality of upright bars which are rigidly secured to and extend between the lower region of said lateral panel of each of said lateral walls and the adjacent one of said beams and of a plurality of vertical, outwardly projecting partitions extending between said feed receiving pockets and the outer surfaces of said lateral panels and laterally deliminating said feeding stations, and, additionally comprising transverse braces interconnecting said beams at spaced apart locations therealong, two closely spaced apart angle irons each having two flanges, said angle irons being parallel to said transverse braces and being mounted with one of their flanges projecting downwardly to closely fit on each side of said rear axle, said cattle feeding box further comprising bolts or the like extending through said downwardly projecting flanges via apertures in said rear axles for holding same together.

11. A cattle feeding box as defined in claim 10, also having a frame member parallel to said transverse braces but mounted near the front end of said cattle feeding box and having two laterally spaced apart downwardly projecting lugs for receiving therebetween a longitudinal member of said fore carriage with limited lateral play, and a bolt or the like extending across said lugs underneath said longitudinal member of said fore carriage, the space left between said last mentioned bolt and said longitudinal member being sufficient to provide a central floating connection of said cattle feeding box to said farm wagon.

12. A cattle feeding box adapted to be removably mounted to a four wheel farm wagon of the type having a narrow reach between the steerable fore carriage and the rear axle, said cattle feeding box comprising an elongate open top rectangular receptacle having a bottom, front and rear walls extending upwardly and essentially vertically from said bottom at each opposite end thereof, and two lateral walls extending upwardly along the sides of said bottom between said end walls and defining in their lower region a plurality of feeding stations through which cattle may have access to feed on said bottom, each lateral wall comprising a lateral panel which extends downwardly from the upper edge of the associated lateral wall but terminates well above said bottom, said cattle feeding box being characterized in that said bottom comprises a narrow central raised portion extending longitudinally of the cattle feeding box for defining a space for the reach of said farm wagon, a substantially vertical trough wall on each side of said central raised portion between the front and rear wheels of said farm wagon, a feed trough bottom surface extending outwardly from the lower edge of each trough wall and rising slightly at its free edge in order to define with said trough wall a relatively low and deep feed receiving pocket at each feeding station between the front and rear wheels of said farm wagon, and a pair of parallel beams disposed at each upper corner of said central raised portion, said beams extending between said front and rear walls and resting upon the front axle of said fore carriage and upon said rear axle, and characterized by two downwardly and inwardly directed racks comprising rack defining upright members which are rigidly secured to and extend between the lower region of said lateral panel of each of said lateral walls and the adjacent one of said beams, said cattle feeding box additionally comprising transverse braces interconnecting said beams at spaced apart locations-therealong, two closely spaced apart angle irons each having two flanges, said angle irons being parallel to said transverse braces and being mounted with one of their flanges projecting downwardly to closely fit on each side of said rear axle, bolts extending through said flanges via apertures in said rear axle, a frame member parallel to said transverse braces but mounted near the front end of said cattle feeding box and having two laterally spaced apart downwardly projecting lugs for receiving therebetween a longitudinal member of said fore carriage, and a bolt or the like extending across said lugs near the free end thereof for preventing withdrawal of said front end from said fore carriage.

* * * * *